US011225820B2

(12) United States Patent
Suzuki

(10) Patent No.: US 11,225,820 B2
(45) Date of Patent: Jan. 18, 2022

(54) ROLLER UNIT

(71) Applicant: AISIN SEIKI KABUSHIKI KAISHA, Kariya (JP)

(72) Inventor: Akinori Suzuki, Kariya (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 69 days.

(21) Appl. No.: 16/691,689

(22) Filed: Nov. 22, 2019

(65) Prior Publication Data
US 2020/0181968 A1 Jun. 11, 2020

(30) Foreign Application Priority Data
Dec. 10, 2018 (JP) .............................. JP2018-230681

(51) Int. Cl.
| | |
|---|---|
| *E05F 15/643* | (2015.01) |
| *B60J 5/06* | (2006.01) |
| *E05F 11/54* | (2006.01) |
| *E05D 15/06* | (2006.01) |
| *E05F 15/655* | (2015.01) |

(52) U.S. Cl.
CPC .............. *E05F 15/643* (2015.01); *B60J 5/06* (2013.01); *E05D 15/0621* (2013.01); *E05F 11/54* (2013.01); *E05F 15/655* (2015.01); *E05Y 2201/658* (2013.01); *E05Y 2900/531* (2013.01)

(58) Field of Classification Search
CPC ... E05F 15/643; E05F 15/655; E05D 15/1047
See application file for complete search history.

(56) References Cited

U.S. PATENT DOCUMENTS

| | | | | |
|---|---|---|---|---|
| 6,021,689 | A * | 2/2000 | Moore ...................... | F16C 1/14 |
| | | | | 74/501.5 R |
| 6,748,820 | B2 * | 6/2004 | Ruhlander .............. | F16C 1/108 |
| | | | | 74/502.4 |
| 8,516,921 | B2 * | 8/2013 | Gordy ....................... | F16C 1/14 |
| | | | | 74/502.6 |
| 9,238,399 | B2 * | 1/2016 | Okuma .................. | E05F 15/643 |
| 9,637,968 | B2 * | 5/2017 | Guitar ................... | E05F 15/643 |
| 9,677,587 | B2 * | 6/2017 | Changsrivong ....... | F16B 21/186 |
| 10,119,314 | B2 | 11/2018 | Urano et al. | |
| 10,161,174 | B2 * | 12/2018 | Whitehurst ......... | E05D 15/1047 |

(Continued)

FOREIGN PATENT DOCUMENTS

| | | |
|---|---|---|
| JP | 3907105 B2 | 4/2007 |
| JP | 2015-137533 A | 7/2015 |
| JP | 2017-166247 A | 9/2017 |

*Primary Examiner* — Gregory J Strimbu
(74) *Attorney, Agent, or Firm* — Oblon, McClelland, Maier & Neustadt, L.L.P.

(57) ABSTRACT

A roller unit to which a cable end of a cable pulled by a door actuator is attached moves with a slide door along a guide rail on a vehicle body, and includes: a coupling part coupled to the slide door; a guide roller supported by the coupling part and moving along the guide rail; a guide pin fixed to the coupling part and inserted into the cable end; and a fastener fastening the cable end to the guide pin. A recess is formed toward an end of the guide pin. An external diameter of the end of the guide pin is smaller than an internal diameter of the shaft hole of the cable end. The fastener includes a supporting part supporting the cable end and a protrusion part engaged with the recess.

20 Claims, 7 Drawing Sheets

(56) References Cited

U.S. PATENT DOCUMENTS 10,323,449 B2* 6/2019 Suzuki ................ E05F 15/643
2015/0033503 A1* 2/2015 Yamada ................ B60J 5/0468
16/91

* cited by examiner

ROLLER UNIT

CROSS REFERENCE TO RELATED APPLICATIONS

This application is based on and claims priority under 35 U.S.C. § 119 to Japanese Patent Application 2018-230681 filed on Dec. 10, 2018, the entire content of which is incorporated herein by reference.

TECHNICAL FIELD

This disclosure generally relates to a roller unit.

BACKGROUND DISCUSSION

JP2017-166247A (Reference 1) describes a vehicle including: a slide door that opens/closes an opening formed on a side part of a vehicle body; a guide rail that extends along the side part of the vehicle body in a front-rear direction; a roller device that moves along the guide rail while supporting the slide door; and a power slide door device causing the slide door to open/close by pulling the roller device along the guide rail. The roller device includes a bracket attached to the slide door and a pin protruded from the bracket. The pin of the roller device is attached with a cable end provided at an end part of a cable extending from the power slide door device.

In the foregoing roller device, a locking protrusion is provided at the leading end of the pin, and an insertion hole is provided in the cable end, in such a way that the locking protrusion is inserted in the insertion hole only when the pin and the insertion hole have a specific position relationship. In other words, at the time of work of attaching the cable end to the pin, the locking protrusion of the pin and the insertion hole of the cable end are configured to overlap with each other when viewed in an axial direction of the pin. Whereas, at the time of operation where the power slide door device pulls the cable, the locking protrusion of the pin and the insertion hole of the cable end do not overlap with each other when viewed in the axial direction of the pin.

The position relationships between the pin and the cable end during the work and the operation, are mutually switched by rotating the cable end around the axial line of the pin by substantially 90 degrees relative to the pin. Accordingly, since the aforementioned roller device necessitates the work of rotating the cable end by substantially 90 degrees when attaching the cable end to the pin, a length of the cable is required to be longer than a length of the cable being required for open/close operation of the slide door. In other words, the cable needs to be set with a relatively longer work stroke for the work of attaching the cable end to the roller device.

A need thus exists for a roller unit which is not susceptible to the drawback mentioned above.

SUMMARY

A roller unit which solves the aforementioned issue is a roller unit to which a cable end of a cable to be pulled by a door actuator is attached and which moves together with a slide door along a guide rail provided on a vehicle body. The roller unit includes a coupling part being coupled to the slide door, a guide roller being supported by the coupling part and moving along the guide rail, a guide pin being fixed to the coupling part and into which the cable end formed with a shaft hole is inserted, and a fastener retaining the cable end inserted in a leading end of the guide pin. A recess is formed toward an axial line of the guide pin at the leading end of the guide pin. An external diameter of the leading end of the guide pin is smaller than an internal diameter of the shaft hole. The fastener includes a supporting part supporting the cable end inserted into the leading end of the guide pin, from the leading end side of the guide pin, and a protrusion part to be engaged with the recess.

According to an aspect of this disclosure, a roller unit with above-described configuration can reduce a work stroke for a cable required in work of attaching a cable end.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
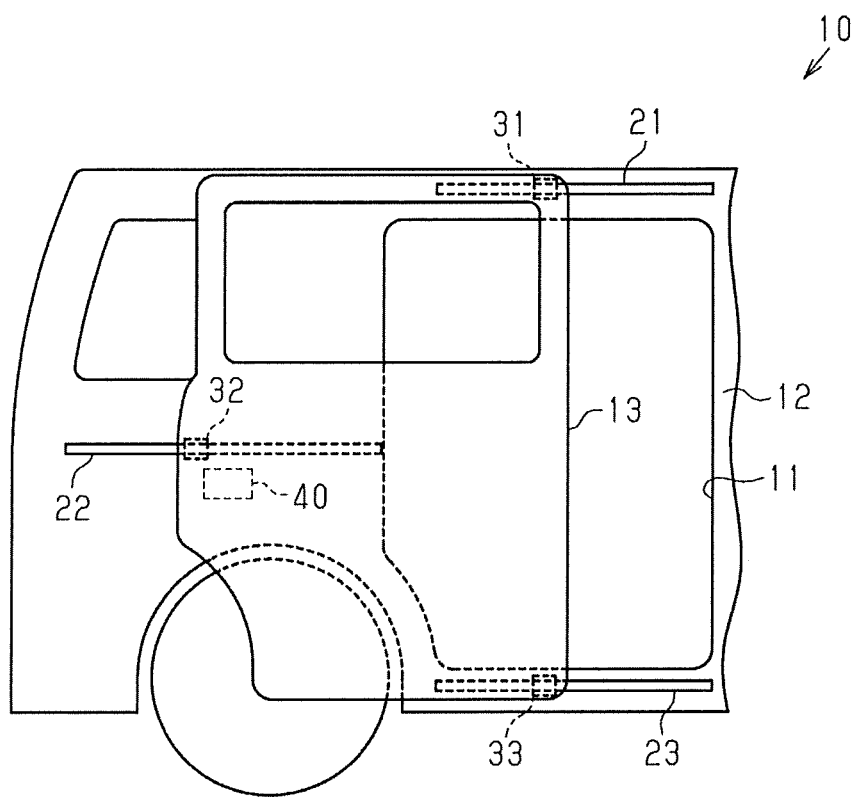
FIG. 1 is a side view of a vehicle according to an embodiment.

The following will describe an embodiment of a vehicle including a roller unit. As illustrated in FIG. 1, a vehicle 10 includes: a vehicle body 12 that is equipped with a door opening 11 on a side part; a slide door 13 that opens/closes the door opening 11; and an upper rail 21, a center rail 22, and a lower rail 23 that each extend in a front-rear direction of the vehicle on the side part of the vehicle body 12. The vehicle 10 also includes an upper roller unit 31, a center roller unit 32, and a lower roller unit 33 that each move together with the slide door 13 in the front-rear direction of the vehicle relative to the vehicle body 12, and a door actuator 40 that drives the slide door 13.

The slide door 13 performs open/close operation between a full close position where the door opening 11 is closed and a full open position where the door opening 11 is opened. When a user gets in/off the vehicle 10, the slide door 13 is shifted to the full open position.

The upper rail 21, the center rail 22, and the lower rail 23 are disposed outside of the vehicle body 12. The upper rail 21 is disposed on an upper part of the door opening 11, the center rail 22 is disposed on a rear part of the door opening 11, and the lower rail 23 is disposed on a lower part of the door opening 11. The center rail 22 is disposed between the upper rail 21 and the lower rail 23 in an up-down direction of the vehicle. While not illustrated in the drawings, after extending toward the front of the vehicle, the upper rail 21, the center rail 22, and the lower rail 23 curve inward in a width direction of the vehicle as proceeding toward the front of the vehicle.

The upper roller unit 31 moves along the upper rail 21 while supporting a top end part of the slide door 13. The center roller unit 32 moves along the center rail 22 while supporting a rear end part of the slide door 13. The lower roller unit 33 moves along the lower rail 23 while supporting a bottom end part of the slide door 13. When each of the upper roller unit 31, the center roller unit 32, and the lower roller unit 33 moves toward the front of the vehicle, the slide door 13 performs close operation in a direction of closing the door opening 11. Whereas, when each of the upper roller unit 31, the center roller unit 32, and the lower roller unit 33 moves toward the rear of the vehicle, the slide door 13 performs open operation in a direction of opening the door opening 11.

Figure 2:
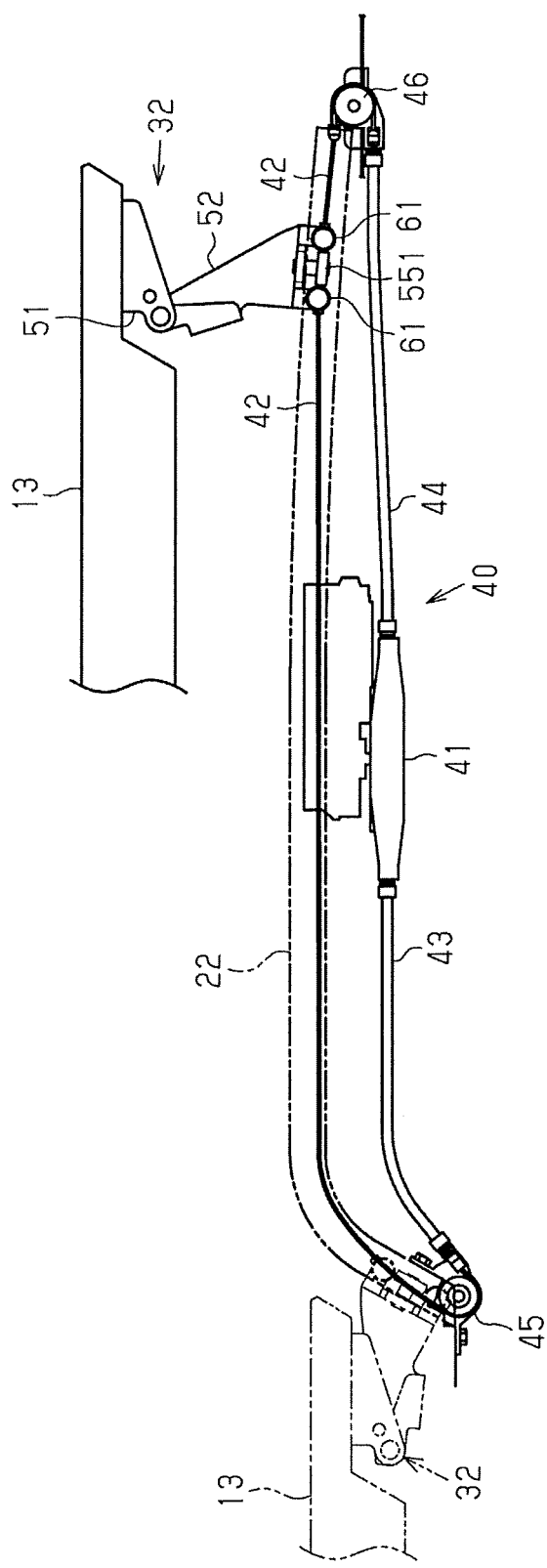
FIG. 2 is a plan view illustrating a schematic configuration of a center roller unit and a door actuator.

As illustrated in FIG. 2, the door actuator 40 is disposed at a position related to the center rail 22 and inside the vehicle body 12. The door actuator 40 includes an actuator main body 41, a cable 42 extending toward the front and rear of the vehicle from the actuator main body 41, a first guide tube 43 and a second guide tube 44 that protect the cable 42, and a first pulley 45 and a second pulley 46 around which the cable 42 is wound. Note that, in FIG. 2, the slide door 13 at a full open position is indicated by a solid line and the slide door 13 at a full close position is indicated by a long dashed double-dotted line.

Figure 3:
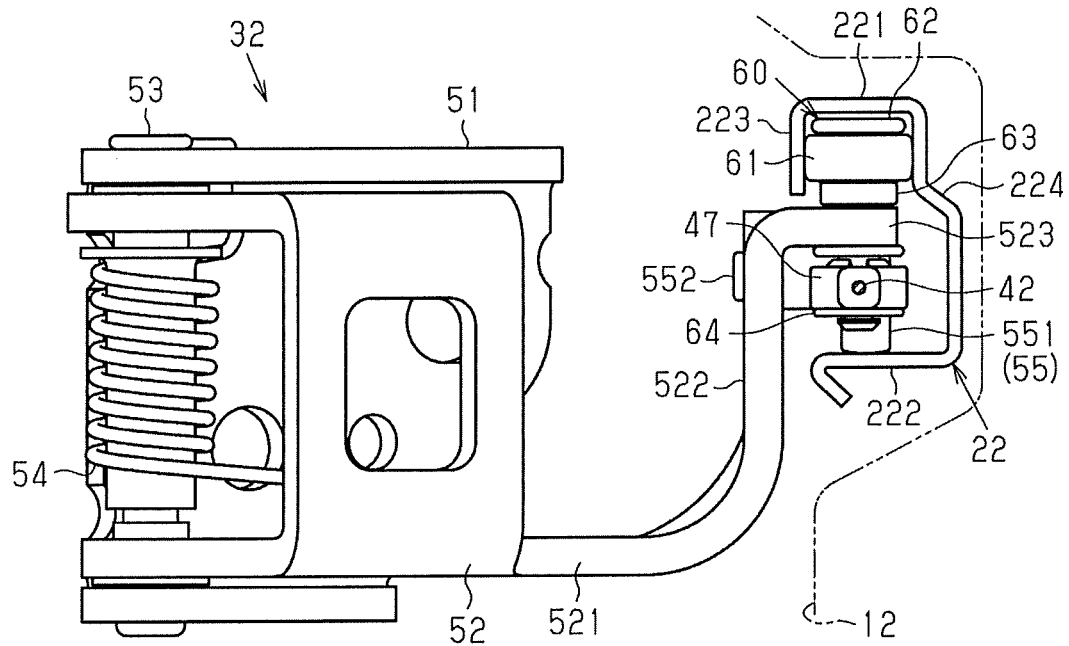
FIG. 3 is a front view of a center rail and the center roller unit.

The actuator main body 41 is configured to include, for example, a drum around which the cable 42 is wound and a motor that drives the drum around the axial line. The cable 42 is a power transmission member that transmits power of the actuator main body 41 to the center roller unit 32. As illustrated in FIG. 3, cable ends 47 serving as parts to be attached to the center roller unit 32 are provided at both end parts of the cable 42. The cable end 47 forms a substantially cylindrical shape with a shaft hole 471 of a circle cross section (refer to FIG. 5). As illustrated in FIG. 2, the first guide tube 43 extends from the actuator main body 41 toward the front of the vehicle and the second guide tube 44 extends from the actuator main body 41 toward the rear of the vehicle. The first pulley 45 is disposed near a front end of the center rail 22 and the second pulley 46 is disposed near a rear end of the center rail 22.

The cable 42 extending toward the front of the vehicle from the actuator main body 41 passes through the inside of the first guide tube 43, and then, is wound around the first pulley 45. The cable 42 wound around the first pulley 45 extends toward the rear of the vehicle along the center rail 22, and then, is connected to the center roller unit 32 via the cable end 47. On the other hand, the cable 42 extending toward the rear of the vehicle from the actuator main body 41 passes through the inside of the second guide tube 44, and then, is wound around the second pulley 46. The cable 42 wound around the second pulley 46 extends toward the front of the vehicle along the center rail 22, and then, is connected to the center roller unit 32 via the cable end 47.

Then, the door actuator 40 causes the center roller unit 32 to move toward the front of the vehicle along the center rail 22 by pulling the cable 42 extending toward the front of the vehicle from the actuator main body 41 while sending the cable 42 extending toward the rear of the vehicle from the actuator main body 41. In other words, the door actuator 40 causes the slide door 13 to perform close operation. On the other hand, the door actuator 40 causes the center roller unit 32 to move toward the rear of the vehicle along the center rail 22 by sending the cable 42 extending toward the front of the vehicle from the actuator main body 41 while pulling the cable 42 extending toward the rear of the vehicle from the actuator main body 41. In other words, the door actuator 40 causes the slide door 13 to perform open operation. In this way, in this embodiment, a so-called power slide door that electrically performs open/close operation is configured.

The following will describe the center rail 22 in detail. In this embodiment, the center rail 22 is equivalent to an example of the "guide rail."

As illustrated in FIG. 3, the center rail 22 includes an upper wall 221 and a bottom wall 222 that each intersect with the up-down direction of the vehicle and a first side wall 223 and a second side wall 224 that each intersect with the width direction of the vehicle. The upper wall 221 connects top ends of the first side wall 223 and the second side wall 224, and the lower wall extends from a bottom end of the second side wall 224 inward in the width direction of the vehicle. In this way, a cross section shape of the center rail 22 orthogonal to a longitudinal direction of the center rail 22 forms a substantially C-shape that opens on the inside in the width direction of the vehicle.

The following will describe the center roller unit 32 in detail. In this embodiment, the center roller unit 32 is equivalent to an example of the "roller unit." In the following description, the center roller unit 32 may also be simply referred to as a "roller unit 32."

Figure 4:
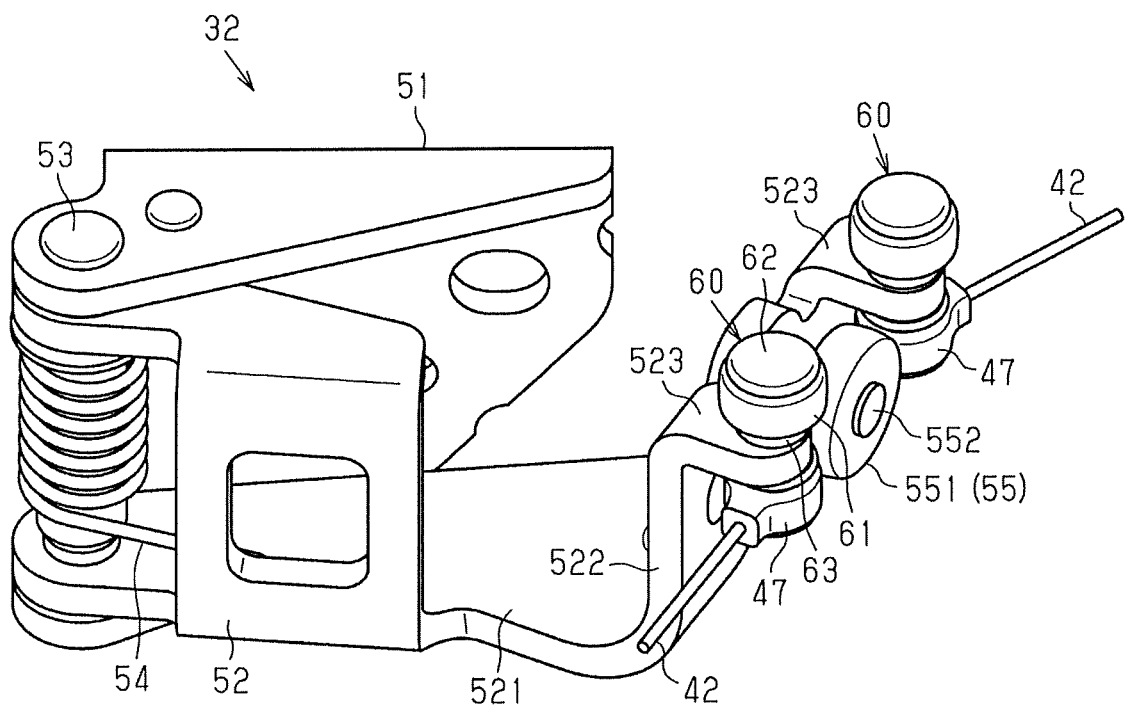
FIG. 4 is a perspective view of the center roller unit.

As illustrated in FIGS. 3 and 4, the roller unit 32 includes a bracket 51 that is coupled to the slide door 13 and a rotating arm 52 that is rotatably coupled to the bracket 51. The roller unit 32 also includes a coupling pin 53 that couples the bracket 51 and the rotating arm 52, a spring 54 that relatively presses the rotating arm 52 against the bracket 51, and a load roller mechanism 55 and a guide roller mechanism 60 that roll in contact with the center rail 22. In this embodiment, an example of the "coupling part" is configured to include the bracket 51 and the rotating arm 52.

As illustrated in FIGS. 3 and 4, the rotating arm 52 includes a first wall part 521 with a base end part through which the coupling pin 53 passes, a second wall part 522 that extends from a leading end of the first wall part 521 in a curved direction away from the first wall part 521, and a third wall part 523 that extends from a top end of the second wall part 522 in a curved direction away from the second wall part 522.

Figure 5:
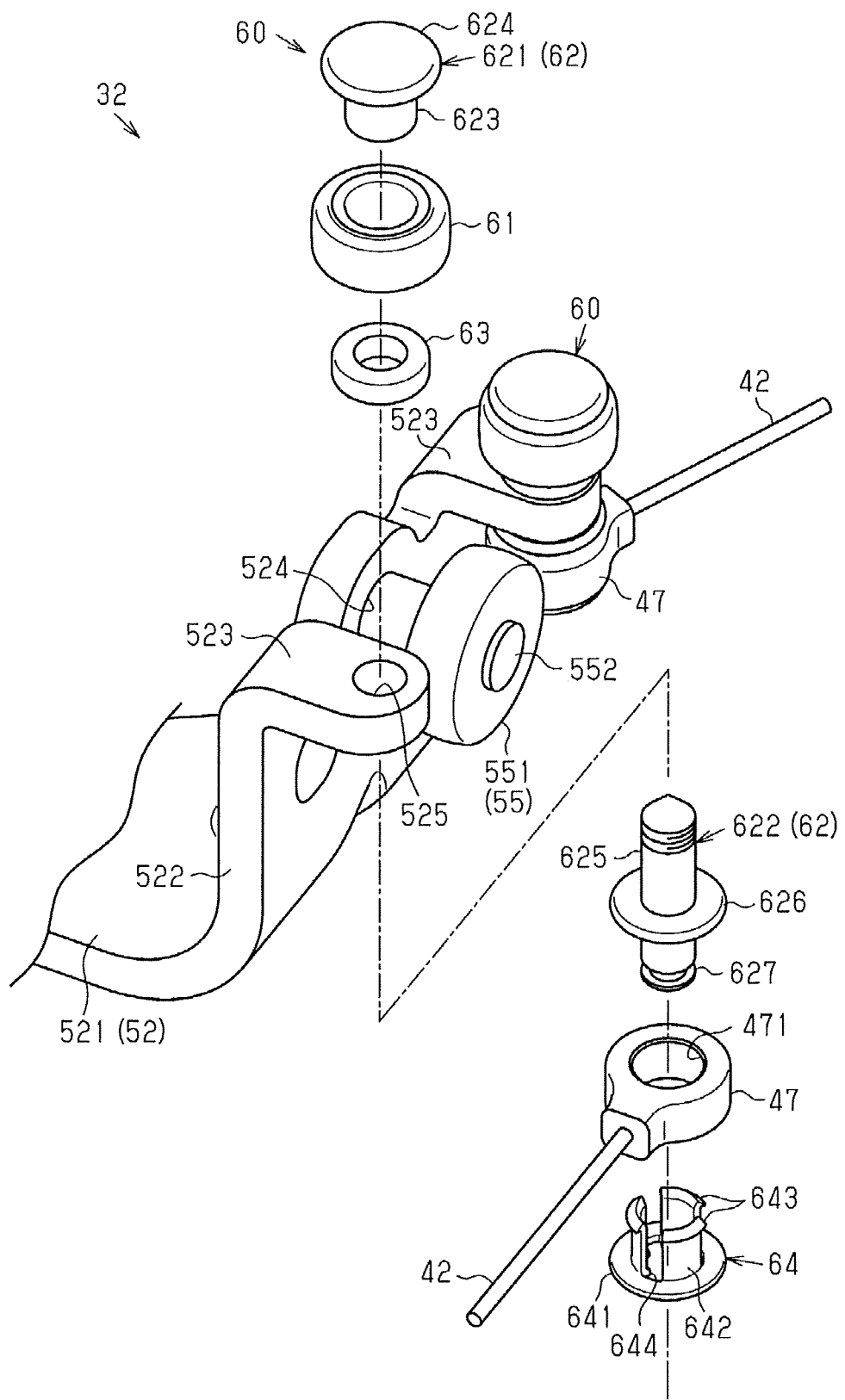
FIG. 5 is an exploded perspective view of the center roller unit.
Figure 6:
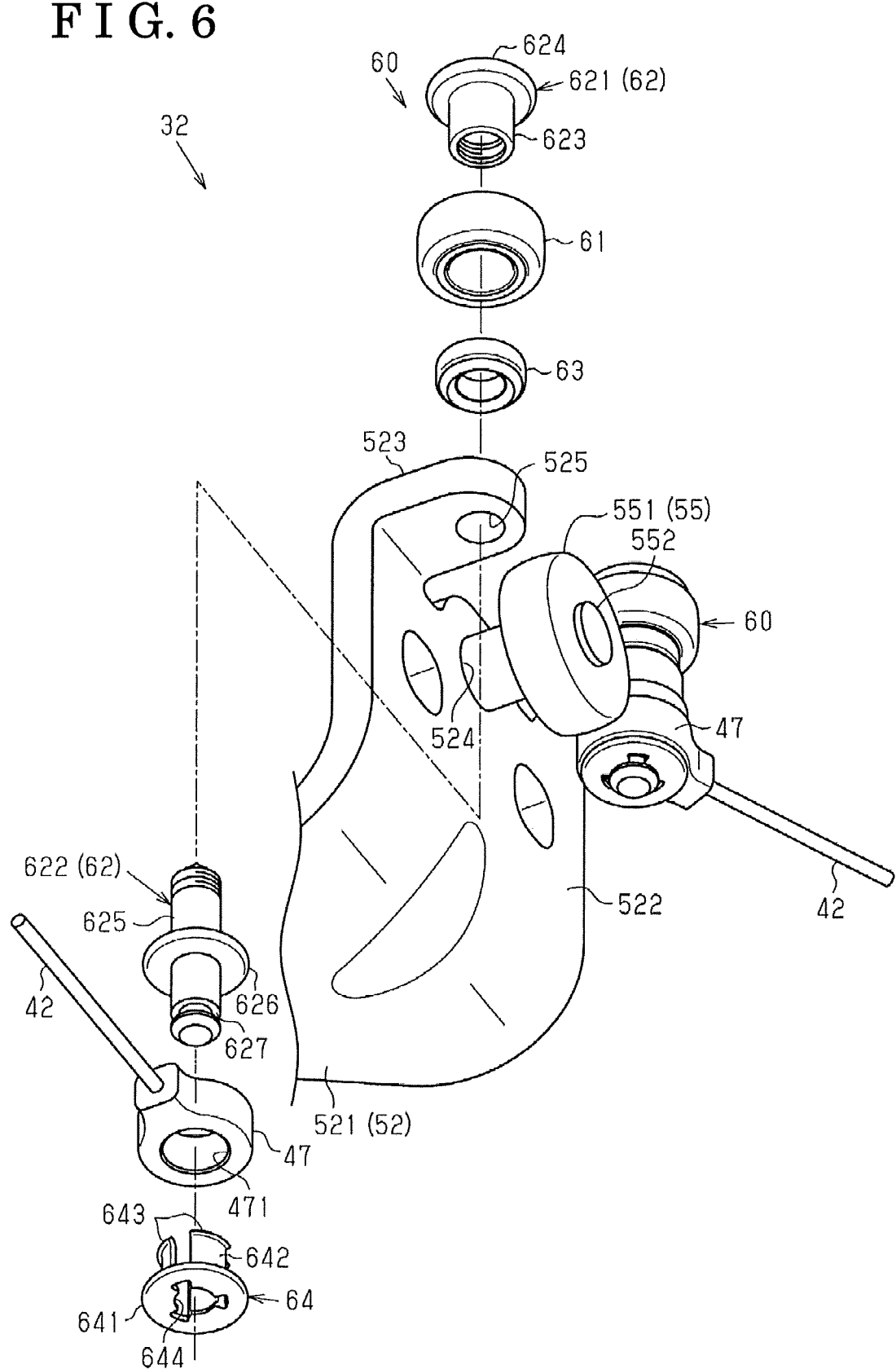
FIG. 6 is an exploded perspective view of the center roller unit.

As illustrated in FIGS. 5 and 6, the first wall part 521 and the third wall part 523 extend in a direction of intersecting with the up-down direction of the vehicle, and the second wall part 522 extends in the up-down direction of the vehicle. Two of the third wall parts 523 are formed in a direction of movement of the roller unit 32 with an interval. A support hole 524 for supporting the load roller mechanism 55 is formed through an upper central part of the second wall part 522 in a thickness direction of the wall. A support hole 525 for supporting the guide roller mechanism 60 is formed through the third wall part 523 in a thickness direction of the wall.

As illustrated in FIGS. 3 and 4, the coupling pin 53 couples the bracket 51 and the rotating arm 52 in such a way that the up-down direction of the vehicle is the axial direction of these components. In this way, a so-called hinge structure is configured by the bracket 51, the rotating arm 52, and the coupling pin 53. The spring 54 is a so-called torsion coil spring. The spring 54 presses the bracket 51 and the rotating arm 52 in a direction of widening an angle between the bracket 51 and the rotating arm 52.

As illustrated in FIGS. 5 and 6, the load roller mechanism 55 includes a load roller 551 that supports the own weight of the slide door 13 and a support pin 552 that rotatably supports the load roller 551. The load roller 551 is in contact with the bottom wall 222 of the center rail 22 in a state where the roller unit 32 is embedded in the center rail 22. Thus, when the slide door 13 performs open/close operation, the load roller 551 rotates in contact with the bottom wall 222 of the center rail 22.

As illustrated in FIGS. 5 and 6, two of the guide roller mechanisms 60 are provided relating to the third walls 523 of the rotating arm 52. The guide roller mechanism 60 includes a guide roller 61 that moves along the center rail 22, a guide pin 62 that rotatably supports the guide roller 61, a spacer 63 that defines a position of the guide roller 61, and a fastener 64 that fastens the cable end 47 to the guide pin 62.

The guide pin 62 is configured to include a first guide pin 621 and a second guide pin 622 that are separate from each other along the axial line. The first guide pin 621 includes a first shaft part 623 of a cylindrical shape and a first flange 624 that extends in a direction of intersecting with the axial line at a base end part in an axial direction of the first shaft part 623. The first shaft part 623 of the first guide pin 621 has a female thread formed therein. Whereas, the second guide pin 622 includes a second shaft part 625 of a cylindrical shape and a second flange 626 that extends in a direction of intersecting with the axial line at a center part in an axial direction of the second shaft part 625. The second shaft part 625 of the second guide pin 622 includes a male thread formed at a base end part thereof. The guide pin 62 is integrated when the male thread of the second guide pin 622 is screwed into the female thread of the first guide pin 621.

The first flange 624 of the first guide pin 621 restricts movement of the guide roller 61 by contacting the guide roller 61 inserted in the first shaft part 623 of the first guide pin 621 from the axial direction. Whereas, the second flange 626 of the second guide pin 622 is an example of a "restricting wall" restricting movement of the cable end 47 by contacting the cable end 47 inserted in the second shaft part 625 of the second guide pin 622.

In the second guide pin 622, an external diameter of a base end side than the second flange 626 is substantially equal to an internal diameter of the support hole 525 of the third wall part 523 of the rotating arm 52, and an external diameter of a leading end side than the second flange 626 is smaller than an internal diameter of the shaft hole 471 of the cable end 47. Further, a circumferential groove 627 is formed in a recessed manner toward the axial line at a leading end of the second guide pin 622. The circumferential groove 627 is formed along a circumferential direction of the leading end of the second guide pin 622. In this embodiment, the circumferential groove 627 is equivalent to an example of the "recess."

As illustrated in FIG. 3, the guide roller 61 is in contact with one side wall of the first side wall 223 and the second side wall 224 of the center rail 22 in a state where the roller unit 32 is embedded in the center rail 22. In other words, the guide roller 61 rotates in contact with one side wall of the first side wall 223 and the second side wall 224 of the center rail 22 when the slide door 13 performs open/close operation.

The fastener 64 is preferably formed of a resin material or a metal material that has suitable elasticity. As illustrated in FIGS. 5 and 6, the fastener 64 includes a supporting part 641 of a ring shape, a bearing part 642 that extends along the axial line from an internal end of the supporting part 641, a holding part 643 that extends from a leading end of the bearing part 642 in a direction of intersecting with the axial line, and a protrusion part 644 that protrudes toward the axial line from the internal end of the supporting part 641.

The supporting part 641 forms a flat plate, and an external diameter of the supporting part 641 is larger than an internal diameter of the shaft hole 471 of the cable end 47. The bearing part 642 is disposed between the guide pin 62 and the cable end 47, and thereby the guide pin 62 and the cable end 47 can smoothly rotate relative to each other. The bearing part 642 is formed of a plurality of (three in this embodiment) circumferential walls with intervals in a circumferential direction of the supporting part 641. As a result, the bearing part 642 can elastically deform in such a way that the leading end part comes closer to the axial line rather than the base end part. Further, an external diameter of the bearing part 642 is slightly smaller than the internal diameter of the shaft hole 471 of the cable end 47, and an internal diameter of the bearing part 642 is slightly larger than the external diameter of the leading end part of the guide pin 62 of the roller unit 32. The holding part 643 forms a claw and extends from the leading end of the bearing part 642 in a direction of intersecting with the bearing part 642. In the axial direction, an interval between the supporting part 641 and the holding part 643 is substantially the same as a thickness of the cable end 47. A plurality of the protrusion parts 644 are formed with intervals in a circumferential direction so as to be related to circumferential walls that constitute the bearing part 642. Assuming a virtual circle that can be formed by connecting internal ends of the protrusion parts 644 in the circumferential direction, an internal diameter of the virtual circle is smaller than an external diameter of the second shaft part 625 of the guide pin 62 and is larger than an external diameter of a portion where the circumferential groove 627 of the guide pin 62 is formed.

The guide pin 62 is fixed to the rotating arm 52 by screwing the second guide pin 622 inserted in the support hole 525 of the third wall part 523 of the rotating arm 52 from vertically below, into the first guide pin 621 inserted in the guide roller 61 and the spacer 63. In this state, the guide pin 62 rotatably supports the guide roller 61 at a position closer to the base end than the leading end part.

The operation of this embodiment will be described. As illustrated in FIG. 2, when mounting the slide door 13 on the vehicle body 12, the center rail 22 and the door actuator 40 are first mounted on the vehicle body 12. Then, the roller unit 32 is embedded in the center rail 22, and the cable end 47 of the cable 42 extending from the door actuator 40 is attached to the roller unit 32. Finally, the bracket 51 of the roller unit 32 is coupled to the slide door 13. This operation is the same for the upper roller unit 31 and the lower roller unit 33 except for attachment of the cable end 47. In this way, the slide door 13 is supported by the vehicle body 12 through the upper roller unit 31, the roller unit 32 (the center roller unit 32), and the lower roller unit 33.

A procedure of attaching the cable end 47 to the roller unit 32 will be described in detail below with reference to FIGS. 7A, 7B, and 7C. Note that, in FIGS. 7A, 7B, and 7C, the guide pin 62 is illustrated as an integrated part in order to facilitate understanding of the description.

Figure 7:
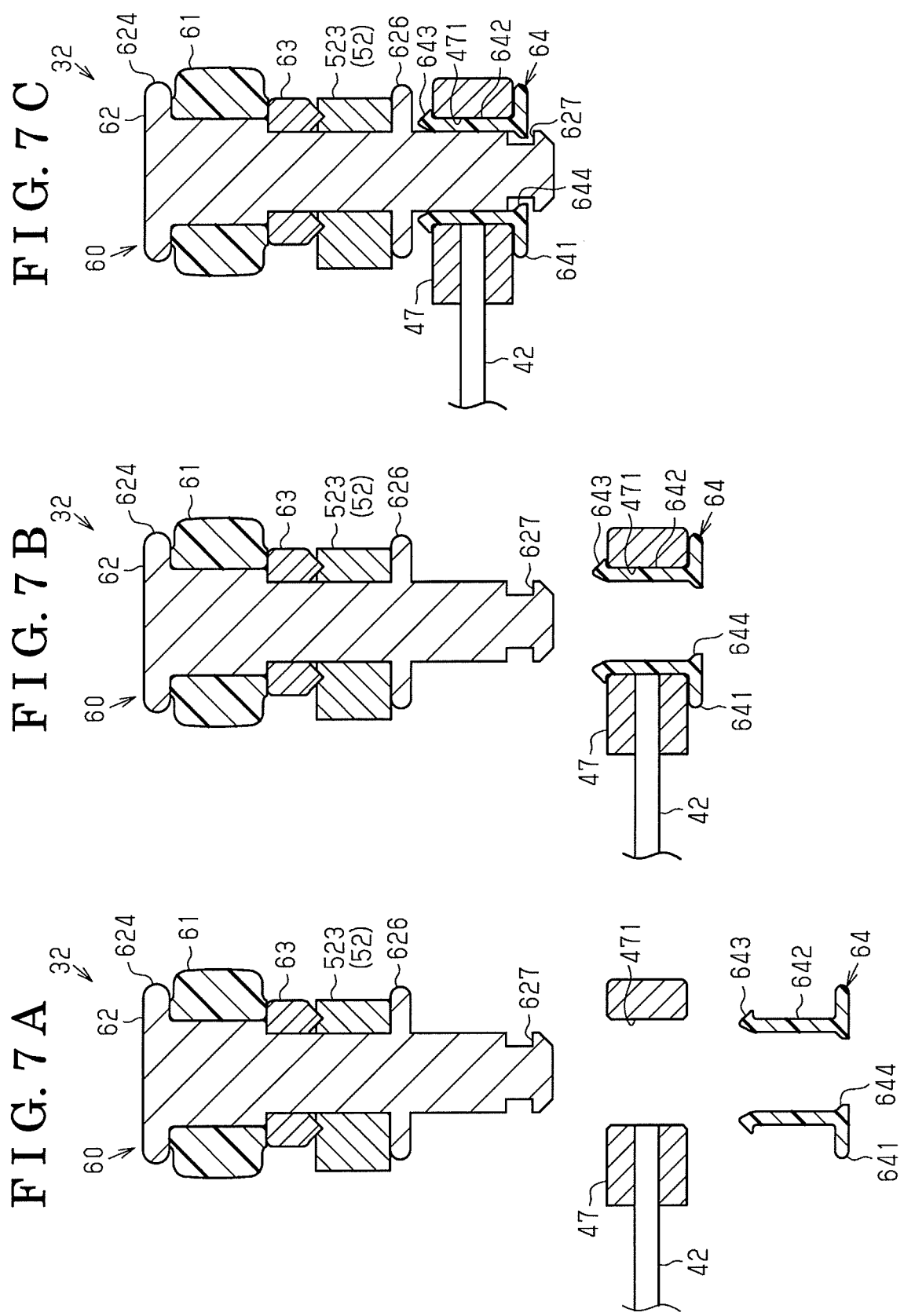
FIGS. 7A to 7C are end views describing how a cable end is attached to the center roller unit.

As illustrated in FIG. 7A, when attaching the cable end 47 to the roller unit 32, the fastener 64 is first inserted in the shaft hole 471 of the cable end 47. Then, the circumferential wall of the fastener 64 elastically deforms toward the axial line and proceeds inside the shaft hole 471 of the cable end 47.

As illustrated in FIG. 7B, when the holding part 643 formed at the leading end of the circumferential wall of the fastener 64 protrudes from the cable end 47, the holding part 643 engages with the end part of the shaft hole 471 of the cable end 47. At this time, the support wall of the fastener 64 and the holding part 643 sandwich the cable end 47 in the axial direction. Accordingly, the fastener 64 is attached to the cable end 47. Further, in a state where the fastener 64 is attached to the cable end 47, the bearing part 642 of the fastener 64 partially covers an internal circumferential surface, in the circumferential direction, of the shaft hole 471 of the cable end 47.

As illustrated in FIG. 7C, after attachment of the fastener 64 to the cable end 47, the cable end 47 is inserted into the guide pin 62 of the roller unit 32. At this time, since the internal diameter of the bearing part 642 of the fastener 64 is slightly larger than the external diameter of the leading end part of the guide pin 62, the cable end 47 of the cable 42 which is folded back to the second pulley 46 can be inserted into the guide pin 62 without changing the orientation thereof.

Figure 8:
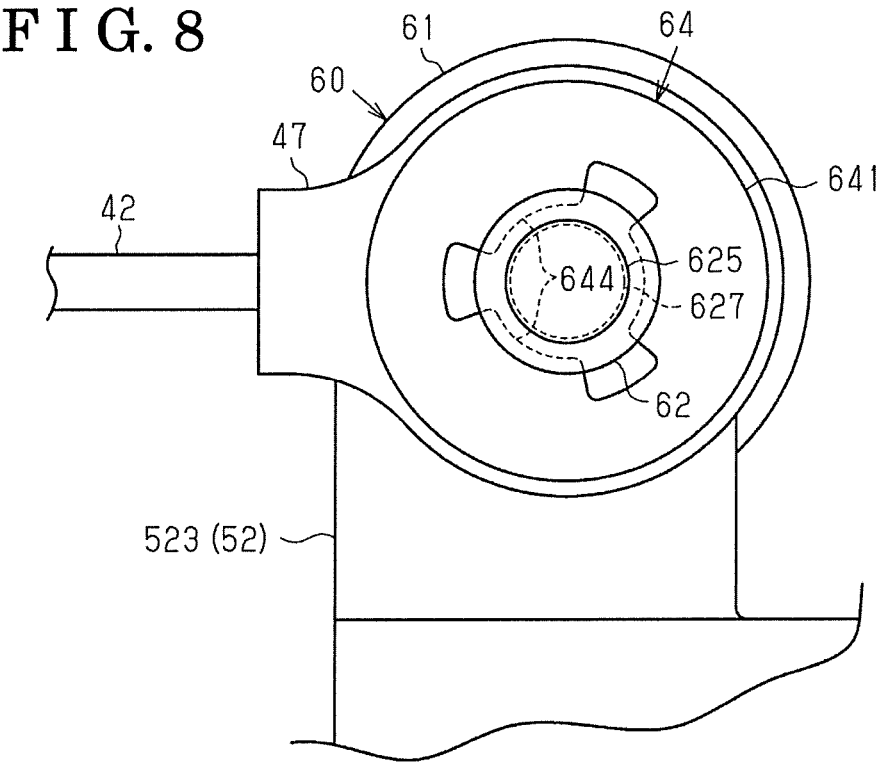
FIG. 8 is a bottom view of the center roller unit to which the cable end is attached.

As illustrated in FIGS. 7C and 8, once the protrusion part 644 of the fastener 64 is engaged with the circumferential groove 627 of the guide pin 62, the cable end 47 is not loosened from the guide pin 62 of the roller unit 32 even when a worker releases his/her hand from the cable end 47. In other words, the supporting part 641 of the fastener 64 supports the cable end 47 from the leading end side of the guide pin 62, thereby the fastener 64 retains the cable end 47 inserted in the guide pin 62. As such, when the door actuator 40 pulls the cable 42, the slide door 13 can perform open/close operation.

The effect of this embodiment will be described.

(1) In a state where the cable end 47 is inserted in the leading end part of the guide pin 62, when the protrusion part 644 of the fastener 64 is engaged with the circumferential groove 627 of the guide pin 62, the cable end 47 is supported by the supporting part 641 of the fastener 64. In such a way, in the roller unit 32, the cable end 47 can be attached to the guide pin 62 fixed to the coupling part. In addition, in the roller unit 32, when the cable end 47 of the cable 42 is inserted into the guide pin 62, the cable end 47 is not required to rotate around the axial line of the guide pin 62. The roller unit 32, therefore, can have a smaller work stroke for the cable 42 extending from the door actuator 40. As a result, there is no need to provide a configuration for disabling the work stroke in the actuator main body 41 of the door actuator 40, which allows to reduce a size of the actuator main body 41.

(2) The fastener 64 includes the bearing part 642 disposed between the guide pin 62 and the cable end 47. In this way, the roller unit 32 can prevent the guide pin 62 and the cable end 47 from directly sliding against each other. For example, the roller unit 32 can prevent wear of the guide pin 62 and the cable end 47 due to contact between them.

(3) The fastener 64 includes the holding part 643 that, together with the supporting part 641, sandwiches the cable end 47 in the axial direction. As such, the fastener 64 can be attached to the cable end 47 in advance by sandwiching the cable end 47 by the supporting part 641 and the holding part 643.

(4) The guide pin 62 includes the circumferential groove 627 formed along the circumferential direction. In this way, a worker is not required to align the circumferential groove 627 of the guide pin 62 with the protrusion part 644 of the fastener 64 around the axial line of the guide pin 62 when engaging the protrusion part 644 of the fastener 64 with the circumferential groove 627 of the guide pin 62. Thus, the roller unit 32 can reduce time and effort of a worker to engage the protrusion part 644 of the fastener 64 with the recess of the guide pin 62.

(5) The guide pin 62 includes the second flange 626 that restricts movement of the cable end 47 by contacting the cable end 47 at a position closer to the base end than the circumferential groove 627 in the axial direction. As such, during driving of the vehicle or the like, when the cable end 47 moves toward the base end part of the guide pin 62, the movement of the cable end 47 is restricted due to contact with the second flange 626. In other words, when the cable end 47 moves toward the base end part of the guide pin 62, the cable 42 does not come into contact with the second flange 626. The roller unit 32, therefore, can prevent wear of the cable 42 caused by the cable 42 coming into contact with components of the roller unit 32.

(6) The guide pin 62 is a part to which the cable end 47 is attached and serves as a part which supports the guide roller 61. In this way, the roller unit 32 can reduce the number of units of the components as compared with a case where a part supporting the guide roller 61 is separately provided in addition to the guide pin 62.

(7) When the cable 42 of the door actuator 40 pulls the roller unit 32, a load is hardly applied to the fastener 64 in a direction of releasing engagement with the circumferential groove 627 of the guide pin 62. In this way, even when the cable 42 pulls the roller unit 32, the fastener 64 is hardly loosened from the guide pin 62.

This embodiment may be implemented with the following modification. This embodiment and the following modification examples may be used in combination within the scope of no technical contradiction.

Figure 9:
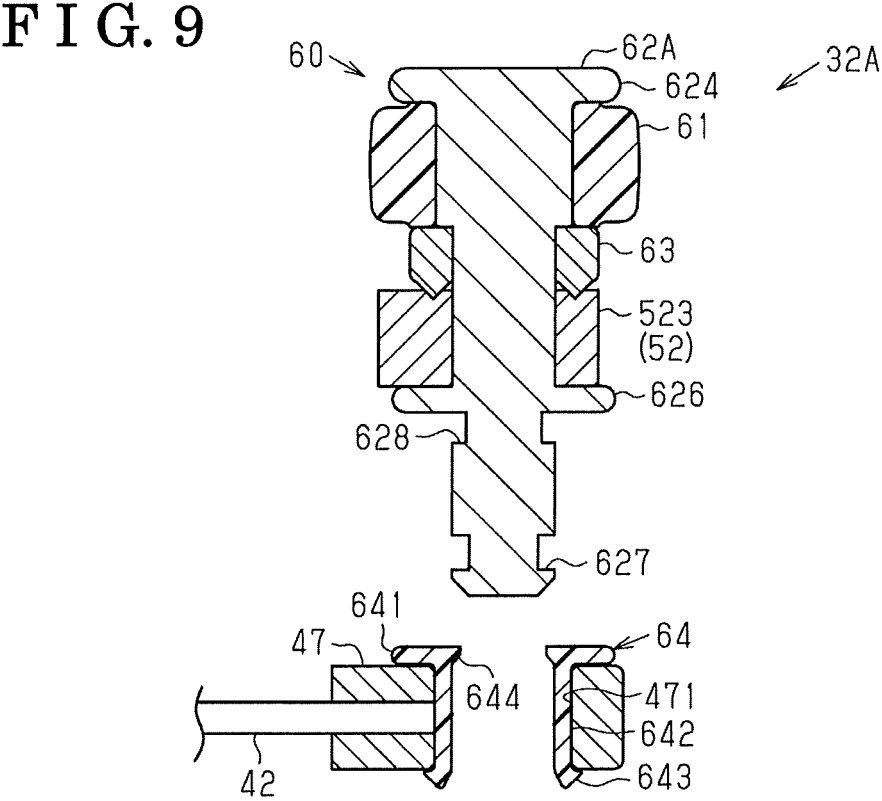
FIG. 9 is an end view of the center roller unit according to a modification example.

The roller unit 32 may be a roller unit 32A including a guide pin 62A as illustrated in FIG. 9. When the circumferential groove 627 is referred to as a first circumferential groove 627, the guide pin 62A is provided with a second circumferential groove 628 which is located closer to the base end than the first circumferential groove 627 and with which the protrusion part 644 can be engaged in a direction toward an axial line of the guide pin 62A. Accordingly, in the roller unit 32A, when the cable end 47 equipped with the fastener 64 is inserted into a leading end part of the guide pin 62A, the protrusion part 644 of the fastener 64 can be engaged with the second circumferential groove 628 of the guide pin 62, even when an insertion direction of the cable end 47 into the guide pin 62A is inverted. As a result, the roller unit 32A can avoid a situation where the cable end 47 cannot be attached to the roller unit 32 when the insertion direction of the cable end 47 into the guide pin 62 is inverted. Note that, in such a case, the supporting part 641 of the fastener 64 supports the cable end 47 from the base end side of the guide pin 62.

The fastener 64 may be unmountable on the cable end 47. For example, the fastener 64 may not include the holding part 643. In such a case, a worker may insert the cable end 47 into the guide pin 62, and then, insert the fastener 64 into the guide pin 62.

The fastener 64 may not include the bearing part 642. In such a case, the interval between the guide pin 62 and the cable end 47 is preferably adjusted in such a way that the cable end 47 attached to the guide pin 62 does not deform in a direction of orthogonally intersecting with the axial direction of the guide pin 62.

In the modification example illustrated in FIG. 9, the guide pin 62 may be formed with only the second circumferential groove 628 without the first circumferential groove 627.

The circumferential groove 627 may be one or more recesses formed with intervals in the circumferential direction of the guide pin 62. In this embodiment, when the fastener 64 includes three protrusion parts 644, three or more recesses are preferably formed.

In the roller unit 32, the guide pin 62 supporting the guide roller 61 and the guide pin 62 to which the cable end 47 is attached may be configured with different members. In such a case, the axial direction of the guide pin 62 to which the cable end 47 is attached may be the up-down direction of the vehicle or the width direction of the vehicle.

The guide pin 62 may be configured so as to integrate the first guide pin 621 and the second guide pin 622 by fitting together, or may be originally configured as one member.

The fastener 64 may have a different shape as long as fastener 64 is configured to engage with the guide pin 62 by, so called, snap fit.

A roller unit which solves the aforementioned issue is a roller unit to which a cable end of a cable to be pulled by a door actuator is attached and which moves together with a slide door along a guide rail provided on a vehicle body. The roller unit includes a coupling part being coupled to the slide door, a guide roller being supported by the coupling part and moving along the guide rail, a guide pin being fixed to the coupling part and into which the cable end formed with a shaft hole is inserted, and a fastener retaining the cable end inserted in a leading end of the guide pin. A recess is formed toward an axial line of the guide pin at the leading end of the guide pin. An external diameter of the leading end of the guide pin is smaller than an internal diameter of the shaft hole. The fastener includes a supporting part supporting the cable end inserted into the leading end of the guide pin, from the leading end side of the guide pin, and a protrusion part to be engaged with the recess.

According to the above-described configuration, in a state where the cable end is inserted in the leading end part of the guide pin, when the protrusion part of the fastener is engaged with the recess of the guide pin, the cable end is supported by the supporting part of the fastener. In this way, in the roller unit, the cable end can be attached to the guide pin fixed to the coupling part. In addition, the roller unit does not require the cable end to rotate around the axial line of the guide pin when the cable end of the cable is inserted into the guide pin. The roller unit, therefore, can have a smaller work stroke for the cable.

In the roller unit described above, the fastener may be disposed between the guide pin and the cable end and may include a bearing part that allows relative rotation of the guide pin and the cable end.

According to the above-described configuration, the roller unit can prevent the guide pin and the cable end from directly sliding against each other.

In the roller unit described above, the fastener may include a holding part that, together with the supporting part, sandwiches the cable end in the axial direction of the shaft hole.

According to the above-described configuration, since the fastener can sandwich the cable end by using the supporting part and the holding part, the fastener can be attached to the cable end in advance. In this way, in the roller unit, the cable end can be attached to the guide pin by inserting the cable end equipped with the fastener into the leading end part of the guide pin.

In the roller unit described above, when the recess is defined as a first recess, the guide pin may include a second recess which is formed closer to the base end than the first recess and which allows engagement of the protrusion part toward the axial line of the guide pin.

According to the above-described configuration, in the roller unit, when the cable end equipped with the fastener is inserted into the leading end part of the guide pin, the protrusion part of the fastener can be engaged with the second recess of the guide pin, even when the insertion direction of the cable end into the guide pin is inverted. In this way, the roller unit can avoid a situation where the cable end cannot be attached when the insertion direction of the cable end into the guide pin is inverted.

In the roller unit described above, the recess may be a circumferential groove formed along the circumferential direction of the guide pin.

According to the above-described configuration, in the roller unit, when the protrusion part of the fastener is engaged with the recess (a circumferential groove) of the guide pin, the recess of the guide pin and the protrusion part of the fastener are not required to be aligned around the axial line of the guide pin. In this way, the roller unit can decrease time and effort of a worker to engage the protrusion part of the fastener with the recess of the guide pin.

In the roller unit described above, the guide pin may include, at a position closer to the base end than the recess in the axial direction, a restricting wall for restricting movement of the cable end by contacting the cable end.

According to the above-described configuration, when the cable end moves toward the base end part of the guide pin, the movement of the cable end is restricted due to contact with the restricting wall. In other words, when the cable end moves toward the base end part of the guide pin, the cable does not come into contact with the restricting wall. The roller unit, therefore, can prevent the cable from coming into contact with components of the roller unit.

In the roller unit described above, the guide pin may support the guide roller at a position closer to the base end than the leading end part.

According to the above-described configuration, the guide pin is a part to which the cable end is attached and serves as a part which supports the guide roller. In this way, the roller unit can reduce the number of units of the components as compared with a case where a part supporting the guide roller is separately provided in addition to the guide pin.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roller unit to which a cable end of a cable to be pulled by a door actuator is attached, the roller unit movable together with a slide door along a guide rail provided on a vehicle body, the roller unit comprising:
 a coupling part being coupled to the slide door;
 a guide roller being supported by the coupling part and movable along the guide rail;
 a guide pin being fixed to the coupling part, the guide pin being inserted into a shaft hole of the cable end; and
 a fastener fastening the cable end to the guide pin, the fastener being inserted in the cable end and disposed on a leading end part of the guide pin, wherein
 a recess is formed in the guide pin at a distal end of the leading end part of the guide pin, an external diameter of the leading end part of the guide pin is smaller than an internal diameter of the shaft hole, and the fastener includes
- a supporting part which axially supports the cable end at the leading end part of the guide pin, the supporting part forming a ring-shaped flat plate at an end of the fastener,
- a bearing part which extends axially parallel to an axis of the guide pin from a radially internal end of the supporting part, and
- a protrusion part to be engaged with the recess, the protrusion part protruding radially inward toward the axis of the guide pin from the internal end of the supporting part.

2. The roller unit according to claim 1, wherein the fastener is disposed between the guide pin and the cable end and the bearing part allows relative rotation of the guide pin and the cable end.

3. The roller unit according to claim 2, wherein the recess is a circumferential groove formed along a circumference of the guide pin.

4. The roller unit according to claim 3, wherein the guide pin supports the guide roller on a first side of the coupling part and supports the cable end on a second side of the coupling part.

5. The roller unit according to claim 2, wherein the guide pin supports the guide roller on a first side of the coupling part and supports the cable end on a second side of the coupling part.

6. The roller unit according to claim 2, wherein the guide pin includes a restricting wall disposed at a proximal end of the leading end part of the guide pin.

7. The roller unit according to claim 2, wherein the fastener includes a holding part that, together with the supporting part, sandwiches the cable end therebteween.

8. The roller unit according to claim 7, wherein the recess is a circumferential groove formed along a circumference of the guide pin.

9. The roller unit according to claim 7, wherein the guide pin supports the guide roller on a first side of the coupling part and supports the cable end on a second side of the coupling part.

10. The roller unit according to claim 7, wherein the guide pin includes a restricting wall disposed at a proximal end of the leading end part of the guide pin.

11. The roller unit according to claim 7, wherein the recess is defined as a first recess, and the guide pin includes a second recess which is disposed at a proximal end of the leading end part of the guide pin and which is engageable with the protrusion part.

12. The roller unit according to claim 11, wherein the guide pin includes a restricting wall disposed at the proximal end of the leading end part of the guide pin.

13. The roller unit according to claim 12, wherein the guide pin supports the guide roller on a first side of the coupling part and supports the cable end on a second side of the coupling part.

14. The roller unit according to claim 11, wherein the first recess is a circumferential groove formed along a circumference of the guide pin.

15. The roller unit according to claim 11, wherein the guide pin supports the guide roller on a first side of the coupling part and supports the cable end on a second side of the coupling part.

16. The roller unit according to claim 1, wherein the guide pin includes a restricting wall disposed at a proximal end of the leading end part of the guide pin.

17. The roller unit according to claim 1, wherein the guide pin supports the guide roller on a first side of the coupling part and supports the cable end on a second side of the coupling part.

18. The roller unit according to claim 1, wherein the recess is a circumferential groove formed along a circumference of the guide pin.

19. The roller unit according to claim 18, wherein the guide pin includes a restricting wall disposed at a proximal end of the leading end part of the guide pin.

20. The roller unit according to claim 18, wherein the guide pin supports the guide roller on a first side of the coupling part and supports the cable end on a second side of the coupling part.

* * * * *